(12) United States Patent
Danzeisen et al.

(10) Patent No.: US 7,995,573 B2
(45) Date of Patent: *Aug. 9, 2011

(54) METHOD AND SYSTEM FOR MOBILE NETWORK NODES IN HETEROGENEOUS NETWORKS

(75) Inventors: Marc Danzeisen, Ittigen (CH); Michael Schaedler, Bolligen (CH); Simon Winiker, Bern (CH)

(73) Assignee: Swisscom AG, Bern (CH)

( * ) Notice: Subject to any disclaimer, the term of this patent is extended or adjusted under 35 U.S.C. 154(b) by 370 days.

This patent is subject to a terminal disclaimer.

(21) Appl. No.: 11/718,567

(22) PCT Filed: Dec. 6, 2004

(86) PCT No.: PCT/EP2004/053295
§ 371 (c)(1),
(2), (4) Date: May 3, 2007

(87) PCT Pub. No.: WO2006/061047
PCT Pub. Date: Jun. 15, 2006

(65) Prior Publication Data
US 2008/0205392 A1    Aug. 28, 2008

(51) Int. Cl.
*H04L 12/28* (2006.01)
(52) U.S. Cl. .................. 370/389; 379/242; 710/316
(58) Field of Classification Search .............. 370/338, 370/352, 389; 455/3.01; 713/185
See application file for complete search history.

(56) References Cited

U.S. PATENT DOCUMENTS

| | | | |
|---|---|---|---|
| 6,711,147 B1 * | 3/2004 | Barnes et al. | 370/338 |
| 2004/0176023 A1 * | 9/2004 | Linder et al. | 455/3.01 |
| 2005/0078660 A1 * | 4/2005 | Wood | 370/352 |
| 2005/0177733 A1 * | 8/2005 | Stadelmann et al. | 713/185 |
| 2006/0182083 A1 * | 8/2006 | Nakata et al. | 370/352 |
| 2006/0198345 A1 * | 9/2006 | Chen | 370/338 |
| 2007/0161375 A1 | 7/2007 | Danzeisen et al. | |

FOREIGN PATENT DOCUMENTS

| | | |
|---|---|---|
| EP | 1 271 896 | 1/2003 |
| EP | 1 424 825 | 6/2004 |
| WO | WO/02/103978 | * 12/2002 |
| WO | 03 028313 | 4/2003 |

OTHER PUBLICATIONS

U.S. Appl. No. 11/576,973, filed Apr. 10, 2007, Danzeisen, et al.

* cited by examiner

*Primary Examiner* — Dang T Ton
*Assistant Examiner* — Lionel Preval
(74) *Attorney, Agent, or Firm* — Oblon, Spivak, McClelland, Maier & Neustadt, L.L.P.

(57) ABSTRACT

A method and a system for creating a communications link between at least two mobile network nodes. A first and a second interface administration module generates look-up tables including available network interfaces of the corresponding mobile network node. Configuration data of the corresponding mobile network node is transmitted to a central unit. Configuration data is transmitted from the central unit to at least one of the mobile network nodes, based on the configuration data. At least one signalling channel is created for transmitting further configuration data via one of the available network interfaces, and, based on the configuration data, at least one data channel is created via one of the available network interfaces.

16 Claims, 1 Drawing Sheet

METHOD AND SYSTEM FOR MOBILE NETWORK NODES IN HETEROGENEOUS NETWORKS

Figure 1:
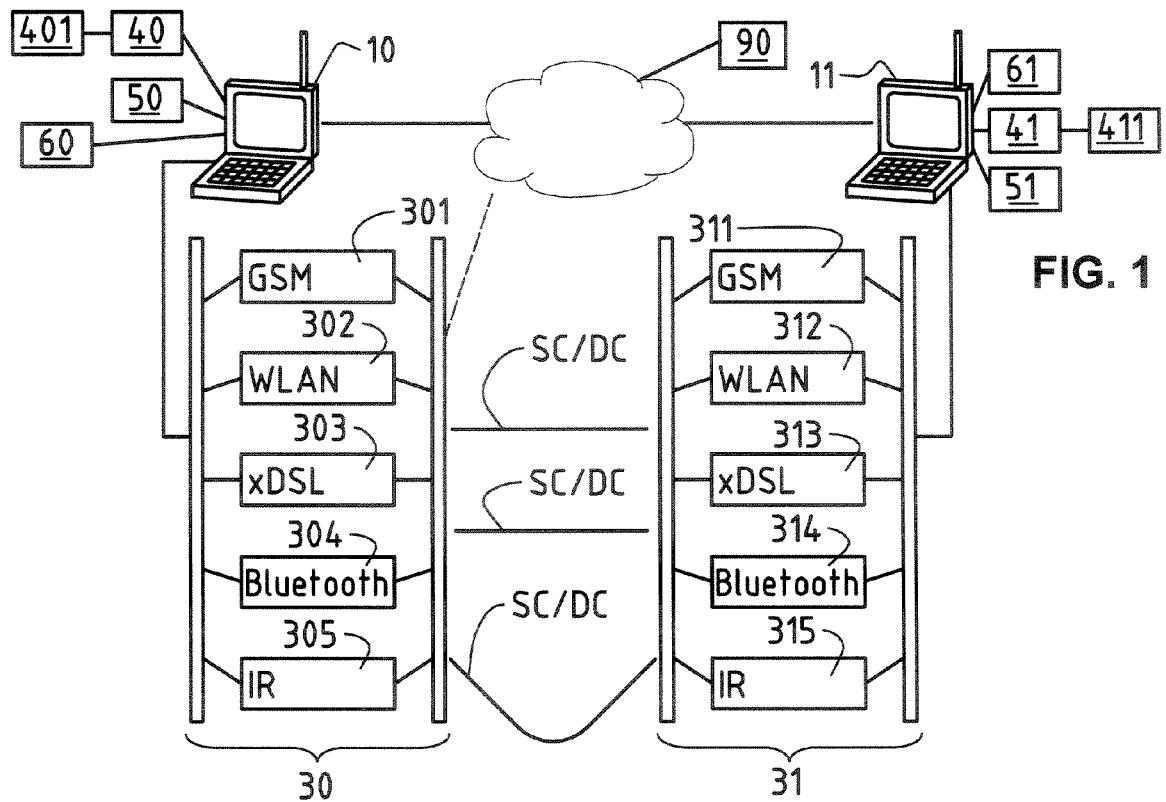

The present invention relates to a method and a system for creating an optimized communication link and/or an optimized communication network between at least two mobile network nodes. In particular the invention relates to optimized communication links and/or optimized communication networks for mobile network nodes in heterogeneous networks.

Worldwide at the present time more and more computer and communication systems are being used to obtain or to transmit large quantities of data, in particular multimedia data, via networks, such as e.g. a LAN (Local Area Network), a WAN (Wide Area Network), or the Internet, via e.g. the public switched telephone network (PSTN), a mobile radio network (PLMN: Public Land Mobile Network), such as e.g. GSM (Global System for Mobile Communication) or UMTS networks (Universal Mobile Telephone <sic. Telecommunications> System), or via e.g. a WLAN (Wireless Local Area Network), etc. Data are thereby shown and/or processed and/or made available to other computer systems in a modified way. Such data comprise e.g. digital data such as texts, graphics, pictures, animations, video, Quicktime and sound recordings. Also belonging thereto are MPx (e.g. MP3) or MPEGx (e.g. MPEG7) standards, as they are defined by the Moving Picture Experts Group. At the same time, in the last few years, the number of mobile network users worldwide, in particular of Internet users and the information offered there, has likewise increased exponentially. The growing offer of IP-capable (Internet Protocol) mobile devices, such as e.g. PDAs (Personal Digital Assistant), mobile radio telephones and laptops, goes hand-in-hand with this development. The transition from fixed network nodes in networks to flexible requirements through increased mobility has, after all, just begun. In mobile radio telephony, this tendency has also shown itself in new standards such as GPRS (General Packet Radio Services), EDGE (Enhanced Data GSM Environment), UMTS (Universal Mobile Telecommunications Service), or HSDPA (High-Speed Downlink Packet Access), among other things, for example. In order to understand the difference between the momentary reality and the IP connection possibilities of the future, one can call to mind, as a comparison, the development of telephony in the direction of mobility in the last twenty years.

Mobile computer use differs in many ways from computer use and network capability in fixed networks. With mobile network use today, there are usually several different network standards for the connection of the mobile network node to a network. The different network connections typically differ greatly, however, in dependence upon the location, network connection, etc., as relates to security, data throughput rate, Quality of Service (QoS) parameters, etc. In particular, a connection can be completely interrupted temporarily. For example, a mobile user can be processed first in the company network by means of fixed net connection, then by means of GPRS or UMTS via a mobile radio network during transit to the airport in a taxi, for instance, and finally continue to work with a WLAN hotspot or access point in the airport waiting room. Existing network access to applications of the mobile network node should not be interrupted thereby when the user changes his location in the network. On the contrary, all connection and interface changes should be able to take place automatically and not interactively, e.g. with a change between different networks (Ethernet, mobile radio network, WLAN, Bluetooth, etc.), so that the user does not even need to have knowledge of them. This also applies with an interface change, e.g. during use of real-time applications. Expediently, an interface change should be able to be additionally optimized in the mobile network node based on data transmission bandwidth, costs, security, etc. Ideally, this should be able to happen automatically of course. Based on a stable connection at any time, e.g. to the Internet, real mobile computing exhibits many advantages. It is only with such an access that work may be organized really freely and independently of the desk. The demands on mobile network nodes in networks differ, however, from the mentioned development in mobile radio technology in various ways. The endpoints in mobile radio communication are usually people. With mobile nodes, however, computer applications can carry out interactions between other network participants without any human effort or intervention. Examples of this may be found often enough in airplanes, on ships and in automobiles. Thus mobile computing with Internet access can make sense together with other applications, such as e.g. in combination with position determining devices, such as the satellite-based GPS (Global Positioning System).

With mobile network access via Internet protocol (IP), the IP is used to redirect, or respectively route, the data packets from the source address to the destination address in the network by means of so-called IP addresses. These addresses are assigned a fixed location in the network, similar to the telephone numbers of the fixed network of a physical socket. When the destination address of the data packets is a mobile node, this means that with each change of network location a new IP network address has to be assigned, making transparent, mobile access impossible. These problems were resolved by means of the mobile IP standard (IEFT RFC 2002, October 1996 and RFC 3220, January 2002) of the Internet Engineering Task Force (IETF), in that the mobile IP allowed the mobile node to use two IP-addresses, one of them being the normal, static IP address (home address), indicating the location of the home network, whereas the second being a dynamic IP address (care-of address) indicating the current location of the mobile node in the network. The assignment of the two addresses makes it possible to redirect the IP data packets to the correct, momentary address of the mobile node.

The mobile IP of the IEFT does not solve all the problems of mobile network use, however. As mentioned, it can be expedient in the case of a multiplicity of available transmission channels to optimize the transmission channels in the mobile network node on the basis of data transmission bandwidth, costs, security, etc., since not all data necessarily require the same QoS parameter. Thus the security of the connection can be much more important than e.g. the transmission rate, for instance for the exchange of security parameters and/or configuration parameters, such as e.g. identification or authentication by means of passwords, keys for data encryption, etc. On the other hand, with the transmission of large quantities of data, e.g. with multimedia data, the bandwidth can play a bigger role than the data security. This applies especially in the setting up of virtual private communication networks. Virtual, private communication networks make possible direct communication between communication partners (peer-to-peer), without unauthorized third parties entering into the communication, or data from the communication being used improperly. In contrast to real private communication networks, virtual private communication networks are set up via shared communication media, and typically secured against unauthorized third parties by means of cryptographic mechanisms. Shared communication media comprise primarily electromagnetic waves, in particular in the radio range or in the infrared range. To secure the data communication over shared communication media, various cryptographic mechanisms are known to one skilled in the art, for example IPSec (Internet Protocol Security) and SSL (Secure Socket Layer), for establishing secured channels, so-called secure pipes. Major problems arise in ensuring the authenticity of a communication partner because even the use of passwords and/or user identifications does not offer any guarantee that these have been transmitted by the authorized user.

Described in the patent U.S. Pat. No. 6,445,920 are devices for configuring or respectively establishing virtual private communication networks between communication terminals of subscribers in mobile radio networks. According to U.S. Pat. No. 6,445,920, subscribers to the mobile radio network who would like to take part in a joint virtual private communication network, are registered in a user database of the mobile radio network, the so-called HLR (Home Location Register), using a special additional identifier related thereto. According to U.S. Pat. No. 6,445,920, when logging a subscriber into the mobile radio network, a user identification is transmitted from the identification module in the communication terminal of the subscriber to the mobile radio network, as in the standardized GSM mobile radio network (Global System for Mobile Communication), and authenticated between the identification module and an access control unit of the mobile radio network, using a cryptographic method. Subscribers, who are registered in the mobile radio network using the special identifier for a particular virtual private communication network, can call each other in the mobile radio network using registered abbreviated dialing numbers, and can profit from reduced communication fees, according to U.S. Pat. No. 6,445,920.

Although the problem of authentication of the subscriber is solved in the patent U.S. Pat. No. 6,445,920 through the GSM authentication of the user identifications, U.S. Pat. No. 6,445,920 gives no hint, however, as to how more than two participants can communicate jointly in a virtual private communication network, or how subscribers in a virtual private communication network can communicate with one another outside the mobile radio network. Communication between a multiplicity of communication terminals in virtual private communication networks outside of cellular mobile radio networks is becoming more and more desirable, however, especially with the pervasiveness of communication terminals equipped with communication interfaces for shared communication media. Communication terminals are being equipped more and more often with communication interfaces for local communication networks based on shared communication media, for example WLAN module (Wireless Local Area Network), radio device interfaces such as Bluetooth, or infrared device interfaces such as IrDA (Infrared Data Association).

It is an object of the present invention to propose a new method and a new system for establishing an optimized communication link and/or an optimized communication network between at least two communication terminals, which do not have the drawbacks of the state of the art. The new method and the new system should in particular make possible the establishing of an optimized communication link and/or an optimized communication network between a multiplicity of communication terminals over a distributed communication medium outside cellular mobile radio networks.

These objects are achieved according to the present invention in particular through the elements of the independent claims. Further advantageous embodiments follow moreover from the dependent claims and from the description.

In particular, these objects are achieved through the invention in that, for creating an optimized communication link and/or an optimized communication network between at least two mobile network nodes, a first and a second interface administration module of a first and second mobile network node checks the corresponding mobile network node for available network interfaces, and generates a first and a second look-up table with available network interfaces of the corresponding mobile network node, in that based on the first and/or second look-up table, first and/or second configuration data of the corresponding mobile network node are transmitted to a central unit, and are stored in the central unit, the first and/or second configuration data comprising at least communication parameters and/or security parameters, in that first and/or second configuration data are transmitted from the central unit to the first and/or second mobile network node, and, in that, based on first and/or second configuration data, by means of a first and/or a second signalling router module, at least one signalling channel is created for transmission of configuration data via one of the available network interfaces, and in that based on the first and/or second configuration data, by means of a first and/or second data router module, at least one data channel is created via one of the available network interfaces. In particular, the mobile network nodes can comprise network interfaces to different networks, such as e.g. Ethernet, Bluetooth, mobile radio networks (GSM: Global System for Mobile Communication, UMTS: Universal Mobile Telephone System etc.) or WLAN (Wireless Local Area Network). An advantage of the invention is that by means of suitable network interfaces signalling channels adapted to specific requirements and thus optimized signalling channels as well as data channels are configurable. The central unit can be designed, for instance, as a module of an HLR (Home Location Register) of a GSM network. As soon as a mobile network node has transmitted configuration data to a central unit, an optimized communication link to this mobile network node from further mobile network nodes allows itself to be created by a calling up of these configuration data. Specific requirements or respectively optimizations can relate, for example to the bandwidth and/or the costs of a data channel. Optimizations can be taken into account in general or individually, for example in a user-specific way and/or user-controlled way and/or in an automated way for the corresponding parameter. This has not at all been possible in this way in the state of the art.

In an embodiment variant, different network interfaces are used for creating the at least one signalling channel and/or the at least one data channel. Such an embodiment variant has in particular the advantage that the at least one signalling and/or at least one data channel can be set up via an especially suitable network interface, such as, for instance, a network interface with suitable authentication mechanisms and/or a network interface with a suitable data capacity.

In an embodiment variant, first and/or second configuration data are transmitted between the corresponding mobile network node and the central unit via one of the available network interfaces. Such an embodiment variant has in particular the advantage that existing network infrastructures can be used for the transmission of configuration data between the mobile network node and the central unit.

In a further embodiment variant, the configuration data are stored in the central unit in an access-controlled way, for access, access request data from mobile network nodes for access to configuration data being checked by means of a conditional access module of the central unit. For instance, billing data for billing of the service availed of with the receiving of the configuration data can also be thereby transmitted over the network to a transaction server. This embodiment variant has the advantage, among others, that the method and system according to the invention can be offered as a service in a network e.g. as part of services of a service provider, etc. In addition, e.g. by means of this embodiment variant, an increased data security can be secured for the network users.

In a further embodiment variant, the transmission of configuration data between a mobile network node and the central unit is authenticated and/or encrypted by means of cryptographic method. Such an embodiment variant has in particular the advantage that, for example, the authorization for transmission of configuration data is checkable, and in that, for example, configuration data are able to be protected against access by unauthorized devices and/or persons.

In another embodiment variant, mobile network nodes are checked by the corresponding interface administration module at definable points in time for available network interfaces, the corresponding look-up tables being updated. This embodiment variant has the advantage that look-up tables are always kept at the most current state, and are available immediately according to the current state. In particular, through a constant monitoring of the network interfaces and their features, a change can be made e.g. automatically between network interfaces, should network interfaces with better features than the momentarily active network interface be available. As embodiment variant, it is also possible to have the criteria for the automatic change of the interface to be determined by the user. This has the advantage, among others, that the user is able to configure interfaces very individually and in keeping with his needs.

In an embodiment variant, at definable points in time and/or with a change in the look-up table, first and/or second configuration data are transmitted to the central unit, and/or called up from the central unit, and, based on the transmitted configuration data, the at least one signalling channel and/or the at least one data channel are dynamically adapted and/or dynamically changed Once again, as an embodiment variant, the adaptation and/or the change can take place automatically based on criteria determined by the user. This has the advantage that the mobile network node always uses the interface with e.g. the momentarily greatest available data throughput and/or with the best cost-performance ratio and/or the highest degree of security, etc. for the signalling channel or respectively the data channel, depending upon defined criteria. In particular, network interfaces can also be dynamically configured. This has the advantage, among others, that e.g. possibly available services, such as e.g. a DHCP (Dynamic Host Configuration Protocol) service, can be used, and the handling becomes simpler for the user through the automation of the configuration.

In an embodiment variant, a multiplicity of signalling channels and/or a multiplicity of data channels are established, different network interfaces and/or communication parameters and/or security parameters being assignable to the individual signalling channels and/or data channels. Such an embodiment variant has in particular the advantage that signalling and/or data channels are able to be provided via different network interfaces, and thus, for example, a greatly increased data transmission security is achievable at the moving mobile network node. Such an embodiment variant also has the advantage that e.g. data throughput and/or security, etc., can be further optimized through the use of parallel signalling channels and/or parallel data channels.

In another embodiment variant, the configuration data comprise parameter for determining the data security and/or the reliability and/or the minimal throughput rate and/or the identification and/or the paging and/or the authentication of the at least one signalling channel and/or the at least one data channel. This embodiment variant has the advantage, among others, that network connections are able to be optimized with respect to further criteria.

In a further embodiment variant, the available network interfaces are at least partially dynamically configured. As above, this has the advantage, among others, that possibly available services, such as e.g. a DHCP (Dynamic Host Configuration Protocol) service can be used, and the handling is simplified for the user through the automation of the configuration.

In still another embodiment variant, the available network interfaces are configured at least partially statically. This has the advantage, among others, that the configuration of the network interfaces for the user is always manageable and/or able to be seen at a glance.

With all the above-mentioned embodiment variants, it is possible in an additional embodiment variant, to buffer outgoing data packets in a data buffer of the mobile network node, in the event that the network connection of the mobile network node be interrupted, so that the output data rate of one or of a multiplicity of applications can be maintained by means of the data buffer or kept within a certain fluctuation tolerance. The advantage of this embodiment variant is, among others, that with a change in the physical interface, the output data rate, e.g. of an application, can be kept constant or within a prescribed fluctuation tolerance, as long as the storage capacity of the data buffer suffices for storing the outgoing data packets. This has once again the advantage that, with an interruption of the network connection, the data throughput rate is not shut down by the applications or the kernel.

It should be stated here that besides the method according to the invention, the present invention also relates to a system for carrying out this method.

SHORT DESCRIPTION OF THE DRAWINGS

In the following, embodiment variants of the present invention will be described using examples. The examples of the embodiments will be illustrated by the following attached figures:

FIG. 1 shows a block diagram illustrating schematically a method and a system for establishing an optimized communication link and/or an optimized communication network between at least two mobile network nodes 10,11. The at least one signalling channel and the at least one data channel are thereby set up separately and optimized.

Figure 2:
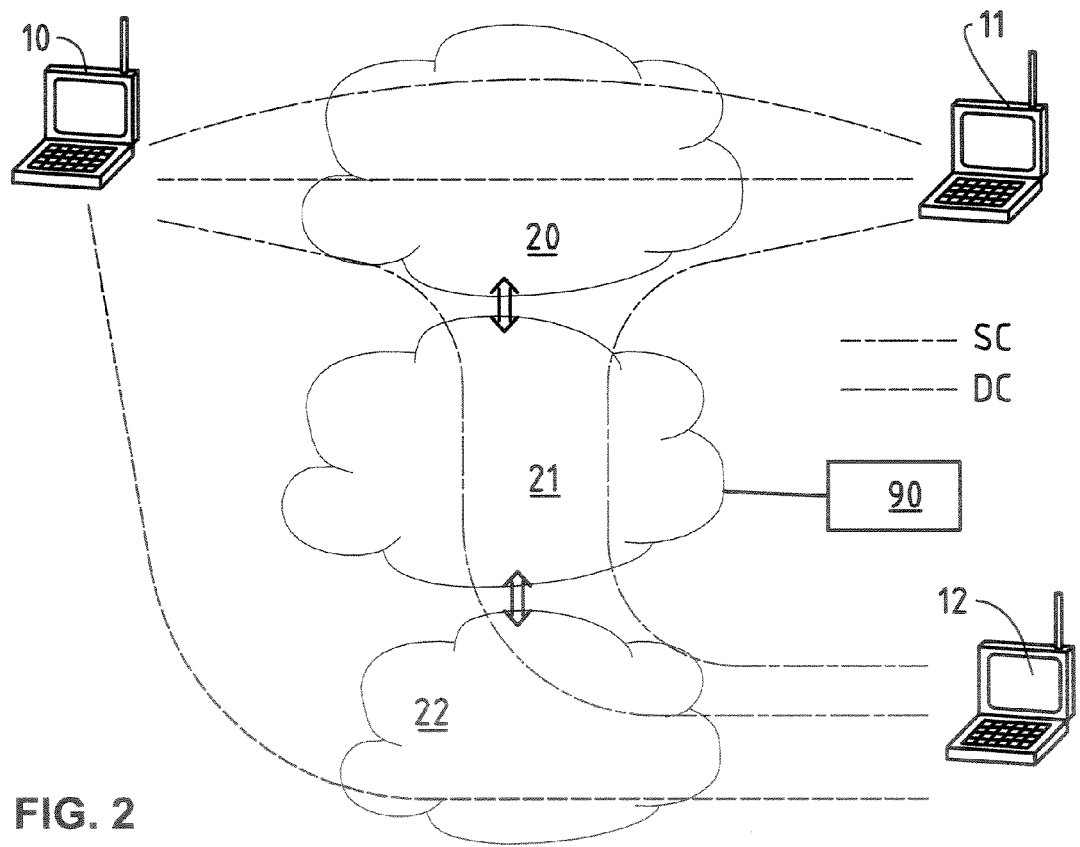

FIG. 2 shows a block diagram illustrating a method and a system for establishing an optimized communication link and/or an optimized communication network between two and/or a multiplicity of mobile network nodes 10,11,12, . . . . The reference numeral 90 thereby indicates the central unit, the reference symbol SC indicates the at least one signalling channel, and the reference symbol DC indicates the at least one data channel.

MODE(S) FOR CARRYING OUT THE INVENTION

FIG. 1 and FIG. 2 illustrate an architecture, which can be used to achieve the invention. In FIG. 2, the reference symbol SC refers to a signalling channel, and the reference symbol DC to a data channel. The reference numeral 90 refers to a central unit, such as a suitably implemented module of an HLR (Home Location Register), for instance. The mobile network nodes 10,11,12, . . . thereby have the necessary infrastructure, including hardware and software components to achieve a described method and/or system according to the invention, in particular in order to set up the connections to the networks 20,21,22, . . . via the available interfaces. Understood by mobile network node 10,11,12 . . . are all possible so-called Customer Premise Equipment (CPE) which are intended for use in the different network locations and/or different networks, such as, for example, portable computers or PDAs (Personal Digital Assistant). The mobile CPEs or network nodes 10,11,12, . . . can have one or a multiplicity of different network interfaces 30, which are also able to support a multiplicity of different network standards 301,302, 303, . . . or respectively 311,312,313, . . . . The network interfaces 30,31 of a mobile network node 10,11,12 . . . can include e.g. interfaces to Ethernet or another wired LAN (Local Area Network), Bluetooth 304,314, GSM (Global System for Mobile Communication) 301,311, GPRS (Generalized Packet Radio Service), USSD (Unstructured Supplementary Services Data), UMTS (Universal Mobile Telecommunications System) and/or WLAN (Wireless Local Area Network) 302,312, xDSL (Digital Subscriber Line) 303,313, IR (infraRed) 305,315 etc. The reference numerals 20,21, 22, . . . correspondingly stand for the various heterogeneous networks, such as e.g. a wired LAN, i.e. a local fixed network, in particular also the PSTN (Public Switched Telephone Network), etc., a Bluetooth network, e.g. for installations in covered locations, a mobile radio network with GSM and/or UMTS, etc., or a wireless LAN. The interfaces 30,31 can be not only packet-switched interfaces, as they are used directly by network protocols such as e.g. Ethernet or Tokenring, but also circuit-switched interfaces, which circuit interfaces can be used by means of protocols such as, for example, PPP (Point to Point Protocol), SLIP (Serial Line Internet Protocol) or GPRS (Generalized Packet Radio Service), i.e. which interfaces have, for instance, no network addresses, such as a MAC or a DLC address. The reference numeral 20 can designate e.g. the usual worldwide IP backbone network. As mentioned, the communication also takes place e.g. over a mobile radio network 21 such as GSM or UMTS, for instance also by means of special short messages, e.g. SMS (Short Message Services), EMS (Enhanced Message Services), over a signalling channel, such as e.g. USSD (Unstructured Supplementary Services Data) or other techniques, such as MExE (Mobile Execution Environment), GPRS (Generalized Packet Radio Service), WAP (Wireless Application Protocol) or UMTS (Universal Mobile Telecommunications System) or over a service channel.

For creating a communication link SC/DC and/or a communication network SC/DC between mobile network nodes 10,11,12, . . . a corresponding interface administration module 40,41 checks the mobile network node 10,11,12, . . . for available network interfaces 30,31, and sets up a look-up table 401,411 with available network interfaces 30,31. As mentioned, the network interfaces 30,31 are administered by an interface administration module 40,41. The network interfaces 30,31 can be physical interfaces, or e.g. be generated through software by e.g. the interface administration module 40,41, i.e. be virtual interfaces. After the checking of the mobile network node 10,11,12, for available network interfaces, the interface administration module 40,41 connects itself to one of the available network interfaces 30,31. The checking of the network interfaces 30,31 can take place e.g. at definable points in time or periodically, i.e. after expiration of a definable time slot, can be manually configurable, or upon request, for instance of a kernel of the mobile network node 10,11,12. The look-up table 401,411 can comprise in particular information, such as possible throughput rate, network availability, network stability, costs of the network use, etc. The connection to a particular interface 30,31 can take place with reference to definable criteria based on information stored in the look-up table. In particular, it can be expedient for the interface administration module 40,41 to change and update the interface 30,31 automatically based on the information of the look-up table. The connection to a particular interface 30,31 can also be definable e.g. by the user and/or can take place manually. The available network interfaces 30,31 can be dynamically configured, e.g. by means of a DHCP service (DHCP: Dynamic Host Configuration Protocol), if such means are available, or statically, e.g. by the user, or with reference to prescribed configuration profiles. Via a current network interface, e.g. one or a multiplicity of IP applications of the mobile network node 10,11,12, . . . can access the heterogeneous networks 21,21,22, . . . .

Subsequently the configuration data based on the look-up tables 401,411 with communication parameters and/or security parameters are transmitted between the corresponding network nodes 10,11 and a central unit 90. The transmission can be based on any suitable communication channel, for example a communication channel based on a GSM mobile radio network can be used. The transmitted configuration data are stored in the central unit 90, and can be transmitted afterwards over any suitable communication channel such as, for instance, again a communication channel based on a GSM mobile radio network, from the central unit 90 to a mobile network node 10,11 Thus, for example, a first mobile network node 10 can transmit first configuration data in a first look-up table to the central unit 90, and a second mobile network node 11 can transmit the first configuration data from the central unit to the second network node 11. The mobile network node 10,11 and/or the central unit 90 can comprise additional authentication modules and/or encryption modules for secure transmission of configuration data between the mobile network node and the central unit 90.

Based on data from look-up tables 401,411 and/or on communication parameters and/or security parameters, by means of a signalling router module 50,51 as well as a data router module 60,61, a signalling channel SC as well as a data channel DC are set up between the first mobile network node 10 and the second mobile network node 11. After establishing the signalling channel SC for transmission of further configuration data, the central unit 90 can be relieved, released for other applications. As follows in particular from FIGS. 1 and 2, the signalling channel SC and the data channel DC can be established based on different criteria using different network interfaces 30,31 and network standards 301,302,303,304,305, . . . and 311,312,313,314,315, . . . . Of course it is clear that, if the criteria are expedient, the signalling channel SC and the data channel DC can be carried out via the same network connection. If the mobile network node 10,11,12 changes the network interface 30,31 or its topological location in the network, the link to the network interface 30,31 can be updated via the interface administration module 40,41, based on the information of the look-up table. For the data channel DC, with a change of the network interface 30,31, a mobile IP module can take over administration of the IP addresses, for example. Also an IPsec module, e.g. an IPsec data tunnel configuration, can update according to the current network connection, whereupon the mobile IP module registers the new care-of address with the home agent, so that the routing of the data packets takes place to the new location or respectively to the new network connection of the mobile network node 10,11,12, . . . , and updates the IP configuration, if necessary, with the home agent according to the momentarily current network interface or network interfaces. The above-mentioned sequence is according to the invention; the course can also take place in reverse order, however.

As described above, the corresponding interface administration module 40,41 can check the first and/or the second mobile network node 10,11 for available network interfaces 30,31 periodically or at definable points in time, and update the respective look-up table 401,411. The transmission of configuration data between the mobile network node 10,11 and the central unit 90 can likewise take place at definable points in time or after a change in the look-up table. Likewise the signalling channel SC can be dynamically adapted and/or changed e.g. by means of the signalling router module 50,51 based on the first and/or second look-up table 401,411 and/or on the communication parameters.

It is important to point out that, according to the invention, also e.g. further signalling channels SC based on the first and/or second look-up table 401,411 and/or on the configuration data can be set up. The individual signalling channels SC can thereby have assigned different communication parameters and/or security parameters. The configuration data can be transmitted periodically and/or with a change in the look-up table 401,411, and based on the transmitted configuration data, the one or a multiplicity of signalling channels SC and/or one or a multiplicity of data channels DC are dynamically routed. Both mobile network nodes 10,11 can include a fallback signalling channel, the fallback signalling channel being used as a temporary signalling channel SC in the case of interruption of one or more of the signalling channels SC. The configuration data can further comprise e.g. parameters for determining the data security and/or the reliability and/or the minimal throughput rate and/or the identification and/or the paging and/or the authentication of a signalling channel SC. The available network interfaces 30,31 can be configured on one side or both sides at least partially dynamically and/or statically.

It remains to be mentioned that in an expanded embodiment example to the above-mentioned embodiment example, outgoing data packets are buffered in a data buffer of the mobile network node 10,11,12, if the network connection of the mobile network node 10,11,12 is interrupted, so that the output data rate of e.g. IP applications connected at the time is maintained by means of the data buffer or kept within a particular fluctuation tolerance, i.e. as long as the storage capacity of the data buffer suffices for storing the data packets. If the network connection interruption thus lies within the time slot foreseen e.g. in the TCP for a connection timeout, the output data rate e.g. for IP applications can be kept such that no automatic lag takes place in the output rate by the IP applications. The storing of the data packets can take place e.g. continuously the same or continuously more slowly, in accordance with the duration of the interruption. It is to be pointed out that precisely with real-time applications, the data buffer can play an important role in order to minimize interruptions and data loss with a change of the topological network location. In an embodiment example, the data buffer can be achieved in a way assigned to a network interface 30, 31 through hardware or software, or integrated; it can also be achieved separately, however, in the mobile network node 10,11.

It is possible, as an embodiment variant, that the mobile network node 10,11 can receive the same data packet at the same time via two or more network interfaces 30,31. This applies both to the signalling channel SC as well as to the data channel DC. Redundant data packets are then automatically recognized in higher layers, and are reduced accordingly.

Through the simultaneous dispatch of data packets and the parallel receipt of the same data packets via two different network interfaces 30,31, the seamless transfer from one interface 30,31 to another, for example, by the mobile network node 10 can be ensured. When using mobile IP, for example at the signalling channel SC and/or at the data channel DC for a mobile network node 10 at least two care-of addresses can be assigned corresponding to the momentarily connected current network interfaces 30,31. If more than two network interfaces 30,31 are connected at the same time, the number of assigned care-of-addresses increases correspondingly. The home agent routes the IP data packets having the home address of the mobile network node 10 in the IP header, in accordance with said multiple registration, in parallel to the different registered care-of addresses, i.e. to different network interfaces of the mobile network node 10,11,12.

As mentioned, the configuration data can be stored, for example in an access-controlled way, in the central unit, for access, access request data from the mobile network node for access to configuration data being able to be checked by means of a conditional access module of the central unit. Billing data, for instance, for billing of the service availed of with the receipt of the configuration data, can also be thereby transmitted to a transaction server over the network. This has the advantage, among others, that the method and system according to the invention can be offered as a service in a network, e.g. as part of services of a service provider, etc. In addition, by means of this embodiment variant, a heightened data security can be ensured for the network user.

To achieve conditional access, i.e. access to the desired individual or a multiplicity of access-controlled data in the central unit 90, the mechanisms defined e.g. in the ETSI standard (European Telecommunications Standards Institute) for access-controlled programs and/or data (services), the so-called conditional access, or other methods can be used. For example, described in the above-mentioned ETSI standard are scrambling/descrambling procedures (encryption/decryption), parameters for signalling and synchronization of the conditional access as well as mechanisms for the control and distribution of entitlement (entitlement data for users) through the transmission of so-called ECM messages (Entitlement Checking Messages) and EMM messages (Entitlement Management Messages). According to the above-mentioned ETSI standards, EMM messages can be transmitted, for example, to a specific customer (user) identified through an unambiguous customer identification, to a small group of customers (users) identified through a group address, to a large group of customers (users) identified through a collective address, or to all customers. According to the ETSI standard, the customer addresses can be stored in the access control system (access control module), and transmitted from the access control system to the EMM receiving module responsible for the receipt of EMM messages of the receiving devices 10, so that this EMM receiving module forwards only such EMM messages to the access control system which contain a customer address that coincides with one of the customer addresses received from the access control system. In an embodiment variant, an ECM/EMM mechanism is provided which uses the user identification via IMSL/MSISDN or similar identification means from the mobile radio system in order to enable the conditional access billing in this way.

The services availed of with the receipt of the configuration data can be billed e.g. by means of billing data transmitted to a transaction server over the mobile radio network. The services can also be booked, however, for instance via reloadable (anonymous) chip cards, which are inserted into one of possibly a multiplicity of card insertion points of the mobile network node, a corresponding monetary amount value being subtracted from the monetary amount value stored there or added thereto. The conditional access module, a financial server, as well as the transaction server, can comprise in each case a multiplicity of software modules, and are implemented on a common computer or a multiplicity of computers. If several of the servers are implemented on a common computer, the data exchange takes place between respective servers, for instance via a software interface. If two of the servers are implemented on different computers, the data exchange takes place between these servers, e.g. over a communication network, for example a fixed network, such as e.g. the public switched telephone network (PSTN: Public Switched Telephone Network), an ISDN network (Integrated Services Digital Network) or another communication link. Corresponding communication functions are achieved in communication modules in the servers, these modules comprising communication protocols achieved through software and/or hardware components for communication over the respective communication network. The communication modules of the financial server comprise moreover the necessary communication protocols and/or hardware components for the communication with the central unit 90 via a communication link, e.g. the above-mentioned communication network, such as, for example, a fixed network, etc., the central unit 90 being provided on its part with corresponding communication modules.

The invention claimed is:

1. A method for creating a communication link between a first mobile network node and a second mobile network node, the method comprising:
   checking at a first interface administration module of the first mobile network node for network interfaces that are available at the first mobile network node, the available network interfaces able to support different network standards;
   generating, at the first mobile network node, a first look-up table with available network interfaces and first configuration data for the available network interfaces of the first mobile network node, the first configuration data including communication parameters and security parameters;
   checking at a second interface administration module of the second mobile network node for network interfaces that are available at the second mobile network node;
   generating, at the second mobile network node, a second look-up table with available network interfaces and second configuration data for the available network interfaces of the second mobile network node, the second configuration data including communication parameters and security parameters;
   transmitting, after extracting the first configuration data from the first look-up table the first configuration data from the first mobile network node over a communication channel to a central unit;
   storing, in an accessible way in the central unit, the transmitted first configuration data;
   sending the first configuration data stored at the central unit from the central unit over a communication channel to the second mobile network node;
   creating a signaling channel by the second mobile network node, based on the received first configuration data and the second configuration data that is available at the second look-up table, by a signaling router module of the second mobile network node, between the first and second mobile network nodes by choosing a network interface that is available at both the first and second mobile network nodes;
   sending further configuration data over the signaling channel; and
   creating a data channel, based on the received first configuration data and the second configuration data, by a data router module of the second mobile network node, between the first and second mobile network nodes via the chosen network interface of said step of creating.

2. The method according to claim 1, wherein a different network interface is used for creating the signaling channel and for creating the data channel.

3. The method according to claim 1, wherein said step of transmitting further comprises:
   transmitting the first configuration data from the first mobile network node to the central unit via one of the network interfaces available at the first network node.

4. The method according to claim 1, further comprising:
   requesting access to the received and stored first configuration data by the second mobile network node at the central unit; and
   controlling the access request by a conditional access module of the central unit.

5. The method according to claim 1, further comprising:
   encrypting the first configuration data before sending the first configuration data from the first mobile network node to the central unit.

6. The method according to claim 1, wherein said step of checking the first interface administration module further comprises:
   repeatedly checking by the first interface administration module at definable points in time for network interfaces that are available at the first mobile network node; and
   updating the first look-up table.

7. The method according to claim 6, wherein said step of transmitting the first configuration data further comprises:
   transmitting the updated first configuration data from the first mobile network node to the central unit; and
   dynamically adapting the signaling channel and the data channel based on the updated first configuration data received from the central unit.

8. The method according to claim 1, wherein the first configuration data includes a parameter for determining at least one of data security, reliability, minimal throughput rate, identification, paging, or authentication of the signaling channel and the data channel.

9. A system including a first mobile network node and a second mobile network node, both connected to a central unit over a network, each of the first and second mobile network nodes having a plurality of network interfaces, the system configured to create a communication link between the first mobile network node and the second mobile network node over at least one of the plurality of network interfaces, wherein
   the first mobile network node is configured to check at a first interface administration module of the first mobile network node for network interfaces that are available at the first mobile network node, the available network interfaces able to support different network standards, is configured to generate and store a first look-up table at the first mobile network node with available network interfaces and first configuration data for the available network interfaces of the first mobile network node, the first configuration data including communication parameters and security parameters, and is configured to transmit, based on information from the first look-up table, the first configuration data from the first mobile network node over a communication channel to the central unit;

the second mobile network node is configured to check at a second interface administration module of the second mobile network node for network interfaces that are available at the second mobile network node, and is configured to generate and store a second look-up table at the second mobile network node with available network interfaces and second configuration data for the available network interfaces of the second mobile network node, the second configuration data including communication parameters and security parameters;

the central unit is configured to store the transmitted first configuration data and is configured to send the first configuration data from the central unit over a communication channel to the second mobile network node, after extracting the first configuration data from the first look-up table; and the second mobile network node is further configured to create a signaling channel, based on the received first configuration data and the second configuration data that is available in the second look-up table, by a signaling router module of the second mobile network node, between the first and second mobile network nodes by choosing a network interface that is available at both the first and second mobile network nodes and is configured to transmit further configuration data over the signaling channel, and is configured to create a data channel, based on the received first configuration data and the second configuration data, by a data router module of the second mobile network node, between the first and second mobile network nodes via the chosen network interface.

10. The system according to claim 9, wherein a different network interface is used for creating the signaling channel and for creating the data channel.

11. The system according to claim 9, wherein the first mobile network node is further configured to transmit the first configuration data from the first mobile network node to the central unit via one of the network interfaces available at the first network node.

12. The system according to claim 9, wherein the second mobile network node is further configured to request access to the received and stored first configuration data at the central unit; and the central unit is configured to control the access request by a conditional access module of the central unit.

13. The system according to claim 9, wherein the first mobile network node is further configured to encrypt the first configuration data before sending the first configuration data from the first mobile network node to the central unit.

14. The system according to claim 9, wherein the first interface administration module of the first mobile network node is configured to repeatedly check at definable points in time for network interfaces that are available at the first mobile network node; and is configured to update the first look-up table.

15. The system according to claim 14, wherein the first mobile network node is further configured to transmit the updated first configuration data from the first mobile network node to the central unit; and the second mobile network node is further configured to dynamically adapt the signaling channel and the data channel based on the updated first configuration data received from the central unit.

16. The system according to claim 9, wherein the first configuration data includes a parameter for determining at least one of data security, reliability, minimal throughput rate, identification, paging, or authentication of the signaling channel and the data channel.

* * * * *